Nov. 1, 1938.　　　　R. W. DINZL　　　　2,134,707
HYDRAULIC TRANSMISSION
Original Filed June 12, 1930　　3 Sheets-Sheet 1

INVENTOR:
R. W. DINZL,
by
Atty.

Nov. 1, 1938.　　　　R. W. DINZL　　　　2,134,707
HYDRAULIC TRANSMISSION
Original Filed June 12, 1930　　3 Sheets-Sheet 2
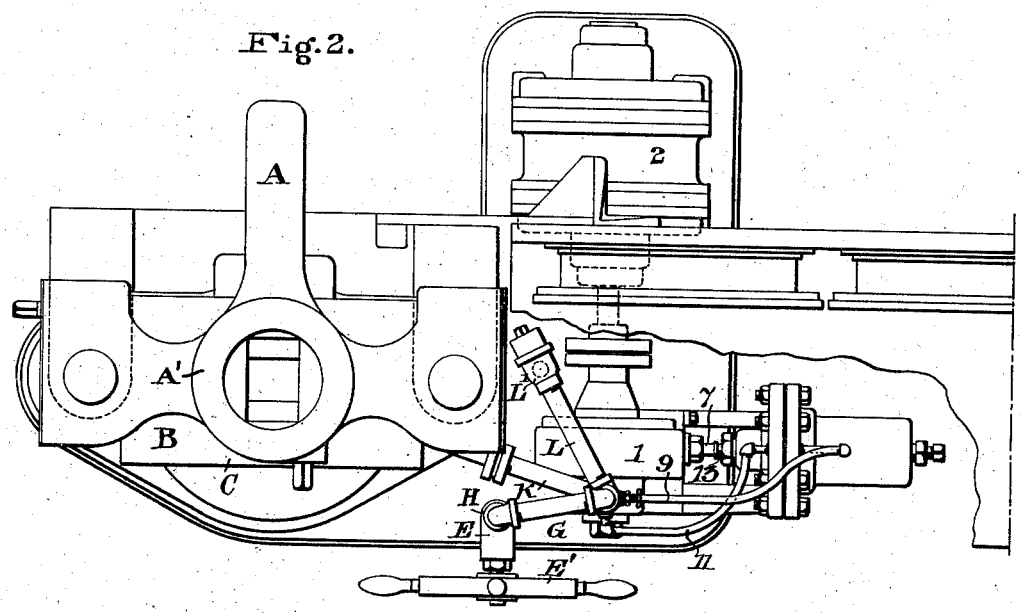
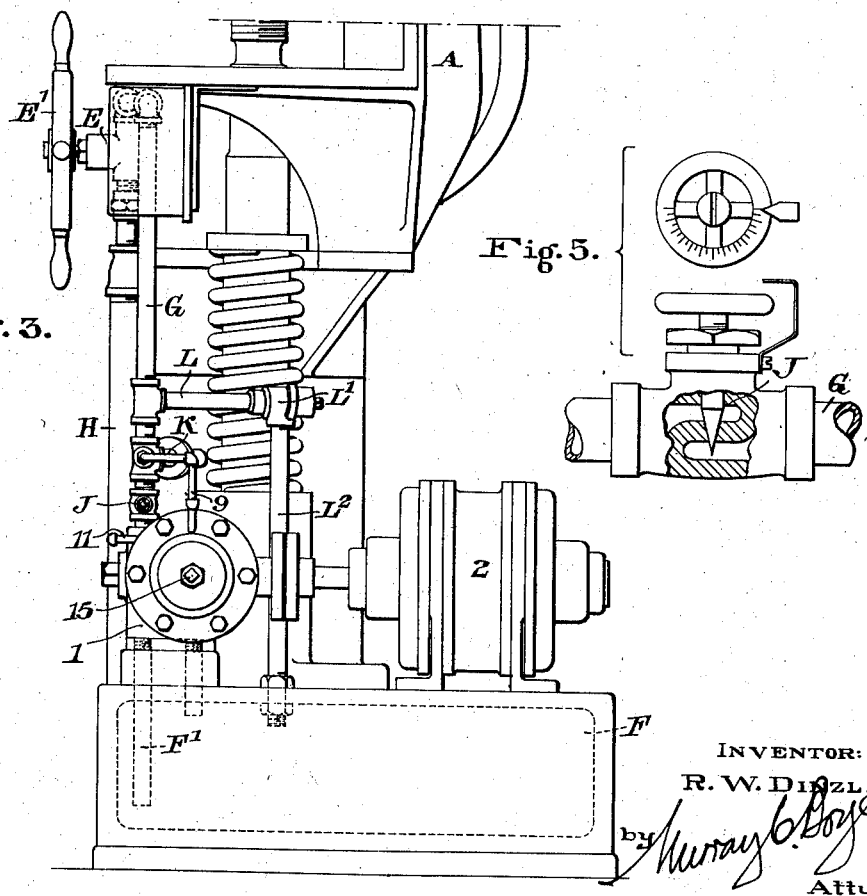
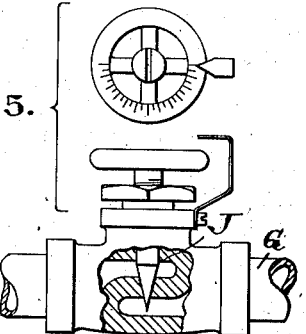
INVENTOR:
R. W. DINZL
by Murray C. Boyer
Atty.

Nov. 1, 1938.     R. W. DINZL     2,134,707
HYDRAULIC TRANSMISSION
Original Filed June 12, 1930     3 Sheets-Sheet 3

INVENTOR:
RICHARD W. DINZL.
by
Atty.

Patented Nov. 1, 1938

2,134,707

UNITED STATES PATENT OFFICE

2,134,707

HYDRAULIC TRANSMISSION

Richard W. Dinzl, Narberth, Pa., assignor, by mesne assignments, to Baldwin-Southwark Corporation, a corporation of Delaware Application June 12, 1930, Serial No. 460,626
Renewed June 26, 1935

13 Claims. (Cl. 60—52)

My invention relates generally to hydraulic transmissions, particularly materials testing apparatus, and it is one object of my invention to provide an improved combination for effecting a substantially constant rate of strain in a specimen. Different materials have their own stress-strain characteristics, and these characteristics may be influenced by varying the rate at which a specimen is strained during a test. As a result, different tests of the same material may indicate different characteristics depending upon the speed with which the operator loads the specimen, thus causing confusion and possible misunderstanding as to the true characteristics of the material. To maintain a substantially constant rate of strain when using a hydraulic testing machine, it is necessary not only to vary the hydraulic pressure of the load producing mechanism but also to vary the quantity of fluid supplied thereto.

It is a further object of my invention to accomplish a uniform rate of specimen strain with a combination of elements that is relatively simple and economical in construction and operation and that is positive and dependable over a wide load range and under wide variations in the deformation of the specimen.

In the specific aspect of the invention I accomplish the foregoing objects by providing in combination a materials testing machine having a hydraulically actuated load producing cylinder and ram supplied with fluid from a continuously operable variable displacement pump, preferably of the Hele-Shaw type, together with a spring loaded diaphragm for controlling the rate of discharge from the pump automatically in accordance with a predetermined pressure differential on opposite sides of an adjustable orifice, the lower pressure being that in the load producing cylinder and the higher pressure that of the pump, whereby any momentary variation in the pressure differential will immediately effect adjustment of the spring loaded diaphragm thereby to adjust the pump discharge and accordingly also adjust the pump pressure so as to reestablish the desired pressure differential. There is thus effected a substantially constant rate of ram movement and accordingly specimen strain throughout the full load range of the apparatus regardless of variations in the pressure or quantity of fluid required. The substantially constant rate of strain does not of course take into consideration possible slippage between the specimen and grips or between the grips and platens, but for purposes of the present invention these factors need not be considered.

A further object of my invention is to provide improved means for controlling the press speed without regard to the resistance of the specimen undergoing test, that is to say, to maintain the same speed of a driven element at low or high readings of the pressure gauges.

These and other features of my invention are more fully described hereinafter; reference being had to the accompanying drawings, in which:

Figure 1 is a front elevational view of one form of testing apparatus with which the improved controlling means forming the subject of my invention may be employed, certain portions being broken away to show the arrangement of parts and details of construction, such as the control valve E and its hand wheel which are turned sidewise to show clearly and diagrammatically their relation to the other elements.

Fig. 2 is a plan view of the same, partly broken away.

Fig. 3 is a side elevation of a portion of the structure looked at from the direction of arrow 16 of Fig. 1.

Figure 1:
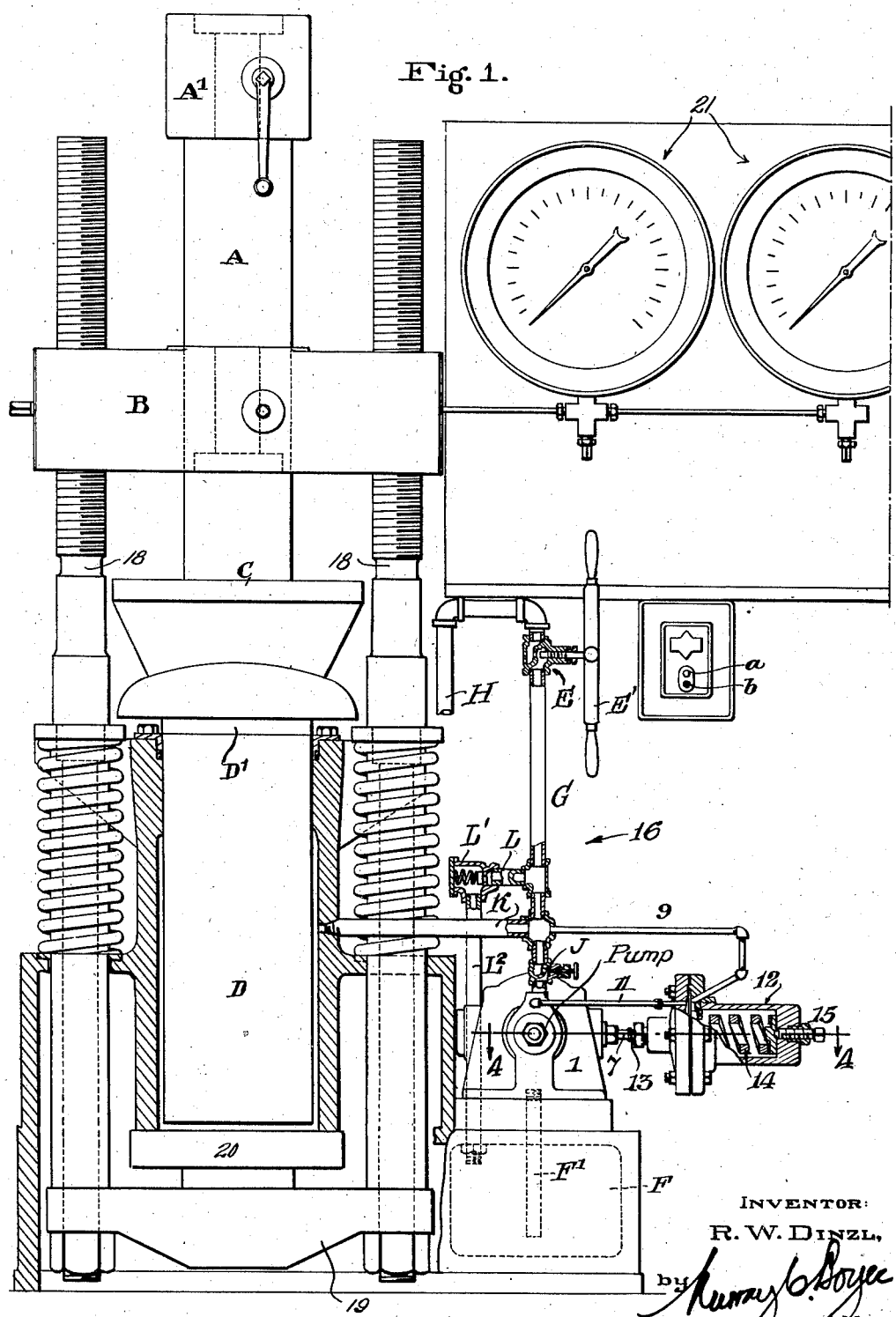
Figure 4:
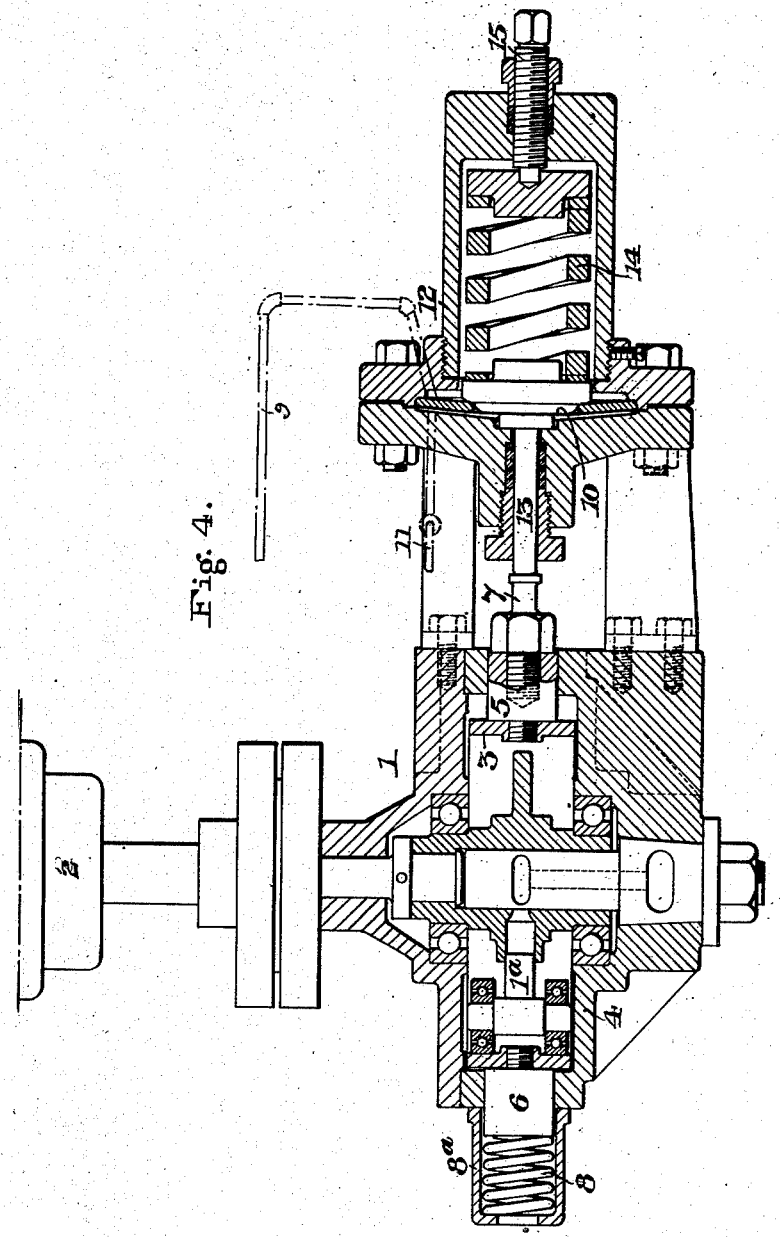

Fig. 4 is a sectional view of the variable pressure pump and the spring loaded diaphragm which controls the position of the floating ring thereof taken substantially on line 4—4 of Fig. 1 and diagrammatically showing the differential pressure pipes 9 and 11 in dotted lines, and Fig. 5 is an elevational view of a regulating or controlling valve of the needle type partly broken away to show details of construction.

In the drawings, A represents the frame of a materials testing machine having an overhanging head portion A'. The machine is of the well-known Emery type such as disclosed in Emery Patent No. 1,846,468, although the invention is of course applicable to other types of hydraulic materials testing machines having in general a hydraulic load producing ram D' and cylinder D for actuating the load producing frame A. Below such overhanging head portion and in alignment therewith an adjustable cross-head B is disposed and below the latter is a table C which is connected to and is movable with the overhanging head portion A'. The overhanging head portion and the cross-head are recessed for the reception of the usual wedging grips between which test pieces undergoing tensile strains may be held. Test pieces undergoing compression strains are mounted between the table C and the adjustable cross-head B. A cross-head B in either tension or compression tests transmits the specimen load through side rods 18, 18 to a lower cross-head 19 which bears upwardly against a suitable weighing system diagrammatically shown as an Emery hydraulic support 20. This hydraulic support is connected to load indicating gauges 21. Further detailed description of the weighing system is not necessary inasmuch as it does not per se form a specific part of my present invention.

In the present instance, the frame A of the testing machine, to which the overhanging head portion A' and the table C are operatively connected, may be raised by directing fluid pressure to a cylinder D containing a movable ram D' to which such frame portion is connected; delivery of such fluid pressure being under the control of a by-pass valve E which may be operated by a hand wheel E'. The delivery of such fluid pressure is effected by the operation of a continuously acting pump of the variable discharge rotary piston type, of which the Hele-Shaw pump is a well-known example and for present purposes may be considered as the type of pump employed. This pump, indicated at 1, may be driven by an electric motor 2 whose operation may be controlled by the switch buttons $a$ and $b$.

The base of the testing apparatus includes a tank or reservoir F for fluid, usually oil. The pump is provided with a suction pipe F' and leading from the pump is a pipe G which communicates with a pipe H in which the by-pass valve E is located; the pipe H leading to the reservoir F. A regulating valve J, which may be of the needle type and of which an example is indicated in Fig. 5, is mounted in the line G just above the pump casing, and at a convenient point, which may be just above this valve, a pipe K is connected through which the fluid pressure may be directed to the cylinder D. In addition a pipe L, connected to the line G, is provided with a relief valve L' through which excess pressure may bleed to the reservoir F via pipe L².

In the operation of pumps of this type, the relative position of the pistons or plungers is controlled by a floating element, usually a ring, movably mounted with respect to the cylinder of the pump casing; such ring being indicated at 3, Fig. 4. This floating ring is supported within the body or casing 4 of the pump in such manner, as indicated in Fig. 4, that motion may be imparted to it to determine the desired eccentricity with respect to the rotating member having the recesses in which the pistons or plungers of the pump work and therefore the amount of fluid passed to the cylinder D containing the ram D' which in turn effects movement of the member or members serving to stretch or compress the test pieces. When the floating ring which controls the position of the pistons is centrally disposed with respect to the cylinder of the pump casing, the relative position of the pistons remains unchanged during revolution of the member carrying the same and although the pump is running the plungers or pistons have no stroke and it is doing no effective work. When, however, the floating ring is moved with respect to the cylinder of the pump; the member carrying the pistons or plungers being rotated by a prime mover such as the motor 2, the relation of the pistons or plungers with respect to the cylinder of the pump is changed and the amount of eccentricity of such floating element determines the stroke of the piston or plungers and the amount of fluid pressure delivered to the cylinder D. In the arrangement indicated in Fig. 4 of the drawings, movement of the floating ring to the left effects changes in the stroke of the plungers or pistons, one of which is indicated at 1ª. In the operation of the testing machine according to my present invention, I desire to control the press speed without regard to the resistance of the specimen; that is to say, to maintain the same speed at low or high readings of the press gauge (or gauges).

The pump 1 may be driven by the direct connected motor 2 and in the present instance actuating mechanism for the floating ring 3 is disposed at each end of the pump casing. In the usual operation of pumps of this type there will be no pumping action until motion has been imparted to the floating ring. In the present instance the floating ring has been displaced toward the left, as indicated in Fig. 4. The floating ring carries relatively disposed members 5 and 6 which project through opposite walls of the pump casing; the member 5 being provided with a thrust pin 7 to which motion is imparted for the purpose of shifting the floating ring in a manner hereinafter described, while at the opposite side of the pump casing an elastic member, which may be a spring 8, is mounted, preferably in the shell 8ª; which spring serves to keep the thrust pin 7 of the floating ring actuating mechanism in contact with its controlling member so as to be immediately responsive to any movement of the same.

The speed at which the press is operated may be regulated by operation of the valve J set in the line G through which fluid is delivered by the pump and this valve controls the volume of fluid delivered. This valve is set before a testing operation begins, in order that the volume of delivery and the speed of the ram may be constant. The line G through which fluid is delivered by the pump is connected via pipe 9 with one side of a spring loaded diaphragm 10, while the discharge of the pump is connected via pipe 11 with the opposite side of this diaphragm, and a constant differential, which may approximate one hundred (100) pounds is maintained on opposite sides of said diaphragm; the greater pressure being delivered via the pipe 11. The diaphragm 10 is mounted at one end of a chamber formed in a suitable casing 12 and is operatively connected to a rod 13 lying in engagement with the thrust pin 7 connected to the floating ring 3. This diaphragm is under the influence of an actuating spring 14 mounted on that side of the diaphragm receiving pressure via the pipe 9, and the pressure exerted by this spring may be regulated to some extent by a set screw 15.

The function of the spring 14 is to supplement the force of the low pressure fluid so as to balance the force of the high pressure fluid whereby in the event that resistance of the specimen should increase so that there is an increase of pressure on the low pressure side, then this increased low pressure together with the force of the spring will cause adjustment of the pump to increase the discharge thereof and accordingly increase the pressure on the high pressure side, thus reestablishing a new balance between the forces acting on opposite sides of the diaphragm. Conversely when the strain of the specimen becomes so great as to cause a reduced load, such as passing through the yield point, then the pressure in the load producing cylinder will drop resulting in a reduced pressure force on the spring side of the diaphragm and thereby permitting the fluid from the high pressure side to move the diaphragm toward the right and accordingly reduce the discharge from the pump until the predetermined pressure differential is established. It will be understood that the diaphragm 10 in moving the rod 13 causes the latter to react upon the thrust pin 7 of the floating ring and impart full movement to the same within the cylinder of the pump casing (such movement being to the left in the present instance) so that when the pump starts to operate it is at full stroke. In the initial position and before the motor is started, the floating ring has been moved by the spring-loaded diaphragm. The delivery from the pump is past the pre-set regulating valve J and with the by-pass valve E open, the fluid will simply be circulated between the pump and the tank. By reason of the restricted opening provided by the regulating valve J, however, the pressure built up by the action of the pump reacts via pipe 11 against the spring-loaded diaphragm; permitting the spring 8 to return the floating ring to position for the delivery of the desired volume of fluid which may be directed to the cylinder D to effect the testing operation. When the by-pass valve E is open and the pump is running the fluid is simply circulated by the pump into and out of the tank via the pipes G and H, and the by-pass valve E. Leading from the pipe G is the line K connected to the cylinder D and the line L normally closed by the spring-loaded relief valve L'. The needle valve J, controlling the volume of flow delivered by the pump, is set before a testing operation begins. When the by-pass valve E is closed the fluid pressure delivered by the pump passes to the cylinder D, past the needle regulating valve J, via line K, and builds up in said cylinder. At the same time pressure passes via pipe 9 to the diaphragm 10 and with the spring 14 effects movement of the floating ring of the pump; to the left as viewed in Fig. 4. When the pressure reaches the point at which the relief valve is set, which may be just short of the total movement of the ram in the cylinder in effecting a testing operation, such relief valve opens and pressure may bleed back to the tank and at the same time the pressure on opposite sides of the diaphragm changes; increasing on one side by pressure delivered via pipe 11 and overcomming the pressure delivered via pipe 9 and that exerted by the spring 14 and the pump slackens.

It will be understood of course that fluid fills the several lines while the circulating period continues, during which time the test specimen may be set in place either between the overhanging head A' and the adjustable cross-head B, or between the latter and the table C which moves with the overhanging head A'. After the test specimen has been set in place, the by-pass valve E is closed and the pressure then delivered by the pump passes the valve J via line G and pipe K to the cylinder containing the ram, to which the movable head and table are connected, and the ram is moved at a constant speed determined by the extent of opening of the regulating valve J. When the test is completed, the by-pass valve may be first opened and then the motor is stopped. While both sides of the diaphragm are exposed to pressure, one side communicating with the pump and the other with the line of fluid delivered by the pump, there exists a constant differential across the opening provided by the needle valve J which, in the present instance is approximately one hundred (100) pounds.

While the testing operation proceeds, the operator watches the gauge (or gauges) so as to be ready to open the by-pass valve should the gauge (or gauges) indicate the maximum pressure for which the machine has been designed, in case the specimens do not fail before such maximum is reached. During the operation of the pump, the constant differential is maintained between the opposite sides of the diaphragm, and the floating ring of the pump is held in position to insure delivery of such pressure at a constant rate. Should overloading occur, the relief valve L' will open and permit the pressure to bleed into the reservoir F in case the operator does not open the by-pass valve promptly. As soon as the by-pass valve is opened, the ram carrying the head and table is free to move in the cylinder; the continued operation of the pump displacing the fluid in the cylinder by which such ram has been moved; the overhanging head and table of the testing apparatus return to the non-operative position, and the spring-loaded diaphragm moves the floating ring to the full stroke position in the pump casing.

While the fluid pressure is being delivered to the cylinder D during the application of the straining or compressing force applied to the specimen undergoing test, the floating ring will be held in such position that the pump will deliver a constant volume of fluid to insure a constant speed of the ram independent of the resistance of the specimen under test by reason of that fact that the higher pressure applied to one side of the diaphragm properly balances the loading spring 14 on the opposite side of the diaphragm in connection with the lower pressure delivered thereto. While both sides of the diaphragm are exposed to pressure it is under a constant differential and any resistance developed by reason of the pressure of the specimen reacts through pipe 9 and the pump pressure immediately builds up to resist it.

It will of course be understood that various changes in details of construction and arrangement of parts may be made by those skilled in the art without departing from the spirit of the invention as set forth in the appended claims.

I claim:

1. The combination with the cylinder of hydraulic apparatus, a ram movable therein, a variable discharge rotary piston pump of the Hele-Shaw type having stroke-adjusting means including a floating element controlling the relative position of the pistons of said pump, and a line providing fluid communication between said pump and cylinder through which pressure may be delivered to effect movement of the ram, of a casing operatively connected to the pump mechanism, a spring-loaded diaphragm disposed in said casing and having its opposite sides in communication with pressure delivered by said pump, means operatively disposed between said diaphragm and the floating element for moving the latter in one direction by the action of said diaphragm, means tending to move the floating element against the action of said diaphragm, and a valve in the delivery line of the pump for controlling the pressure delivered to one side of said diaphragm.

2. The combination with the cylinder of hydraulic apparatus and a ram movable therein, of a variable discharge rotary piston pump of the Hele-Shaw type having stroke-adjusting means including a floating element controlling the relative position of the pistons of said pump; the latter being in fluid communication with said cylinder and delivering pressure thereto to effect movement of said ram, a spring-loaded diaphragm, means operatively disposed between said diaphragm and said floating element for actuating the latter in one direction, means for delivering pressure to opposite sides of said diaphragm to maintain a constant differential, a valve for controlling the pressure delivered to one side of said diaphragm, and means tending to hold said floating element in neutral position.

3. The combination with the cylinder of hydraulic apparatus, a ram movable therein, a variable discharge rotary piston pump of the Hele-Shaw type having stroke-adjusting means including a floating element controlling the relative position of the pistons of said pump; a line providing fluid communication between said pump and cylinder through which pressure may be delivered to effect movement of the ram, of a casing operatively connected to the pumping mechanism, a spring-loaded diaphragm mounted in said casing, a line delivering pressure directly from the pump to a chamber at one side of said diaphragm, a connection from the pump line delivering pressure to a chamber at the other side of said diaphragm, means operatively disposed between said diaphragm and the floating element for moving the latter in one direction by the action of said diaphragm, a spring tending to move the floating element in the opposite direction against the action of said diaphragm, and a valve in the delivery line of the pump for controlling the pressure delivered to one side of said diaphragm.

4. In pumping mechanism for hydraulic apparatus, the combination of continuously operating variable volume pumping mechanism of the Hele-Shaw type having stroke-adjusting means, and means for controlling said variable volume pumping mechanism comprising a pressure-operated diaphragm operatively connected to the stroke-adjusting means of the said pumping mechanism, a casing enclosing said diaphragm, a spring interposed between a wall of said casing and one side of said diaphragm for loading the same, means providing for fluid communication between opposite sides of said diaphragm and the delivery side of said variable volume pumping mechanism whereby fluid under differing pressure may be directed to opposite sides of said diaphragm, and a valve in the delivery line of the pumping mechanism for controlling the fluid pressure delivered to one side of said diaphragm.

5. The combination with a cylinder for hydraulic apparatus, a ram movable therein at a relatively slow rate while subjected to a varying resistance against movement, a continuously operating variable discharge rotary piston pump in which the piston stroke may be varied during said continuous operation and during a single stroke of said ram, mechanism for adjusting the stroke of the pump pistons, a passage providing fluid communication between said pump and cylinder for effecting movement of the ram, and fluid pressure means for automatically controlling said stroke adjusting mechanism to effect a substantially predetermined rate of ram movement during variations in the fluid pressure force required to effect said ram movement.

6. The combination with a cylinder for hydraulic apparatus, a ram movable therein at a relatively slow rate while subjected to a varying resistance against movement, a continuously operating variable discharge rotary piston pump in which the piston stroke may be varied during said continuous operation and during a single stroke of said ram, mechanism for adjusting the stroke of the pump pistons, a passage providing fluid communication between said pump and cylinder for effecting movement of the ram, a throttling orifice in said passage for effecting differential pressures in said passage whereby the higher one of said differential pressures is that of the pump and the lower pressure is that of the ram cylinder, and fluid pressure means responsive to said differential pressures for directly controlling and operating said stroke adjusting mechanism to effect a substantially constant rate of movement of said ram.

7. The combination set forth in claim 6 further characterized in that said means for controlling the stroke adjusting mechanism includes a movable element whose opposite sides are subjected respectively to the differential pressures.

8. The combination set forth in claim 6 further characterized in that said orifice is adjustable, whereby said controlling means automatically effects adjustment of the piston stroke so as to increase the pump displacement for larger openings of the orifice and to decrease the pump stroke for smaller openings of the orifice thereby to vary the rate of ram movement.

9. The combination set forth in claim 6 further characterized in that said means for controlling the stroke adjusting mechanism includes a diaphragm whose opposite sides are subjected to said differential pressures, and means for producing a force constantly acting on one side of said diaphragm to supplement the pressure force on that side whereby a substantially constant pressure differential is maintained on opposite sides of said orifice.

10. A hydraulic transmission, comprising a hydraulic motor, a pump connected to said motor for delivering liquid thereto to drive the same, a choke connected in series with said motor, and means responsive to the drop in pressure across said choke for varying the relative displacements of said pump and said motor to thereby maintain the speed of said motor substantially constant.

11. A hydraulic transmission, comprising a hydraulic motor, a variable displacement pump connected to said motor for delivering liquid thereto to drive the same, a choke connected in series with said motor, and means responsive to the drop in pressure across said choke for varying the displacement of said pump to thereby maintain the speed of said motor substantially constant.

12. A hydraulic transmission, comprising a hydraulic motor, an adjustable variable delivery pump connected to said motor for delivering liquid thereto to drive the same, a choke of normally fixed flow area communicating on one side with said motor and on the other side with said pump, and means responsive to variations in pressure across said choke for adjusting the operation of said pump to vary the delivery of fluid therefrom to said motor so as to maintain the speed of said motor substantially constant during variations in the pressure across said choke.

13. The combination with a cylinder for hydraulic apparatus, a ram movable therein at a relatively slow rate while subjected to a varying resistance against movement, a continuously operating variable discharge rotary piston pump in which the piston stroke may be varied during said continuous operation and during a single stroke of said ram, mechanism for adjusting the stroke of the pump pistons, a passage providing fluid communication between said pump and cylinder for effecting movement of the ram, fluid pressure means including a throttling orifice in said passage for automatically controlling said stroke adjusting mechanism to effect a substantially predetermined rate of ram movement during variations in the fluid pressure force required to effect said ram movement, and a manually adjustable valve for by-passing fluid from said passage at a point between said throttling orifice and said cylinder.

RICHARD W. DINZL.